United States Patent [19]

Blakeslee, III et al.

[11] 4,321,229
[45] Mar. 23, 1982

[54] METHOD FOR EXTRUDING LINEAR POLYOLEFIN MATERIALS HAVING HIGH VISCOSITIES

[75] Inventors: Theodore R. Blakeslee, III, Hillsborough; Stuart J. Kurtz, Martinsville; Leonard S. Scarola, Union; John C. Miller, Piscataway, all of N.J.; James D. Engle, Darien; Jerome T. Horner, Indian Head Park, both of Ill.

[73] Assignee: Union Carbide Corporation, New York, N.Y.

[21] Appl. No.: 199,651

[22] Filed: Oct. 22, 1980

[51] Int. Cl.³ .............................................. B29B 1/06
[52] U.S. Cl. ............................ 264/349; 264/176 R; 366/79; 366/90; 425/168; 425/183; 425/208
[58] Field of Search .......................... 264/349, 176 R; 425/168, 183, 202, 206–209; 366/79–90, 323, 324

[56] References Cited

U.S. PATENT DOCUMENTS

| | | |
|---|---|---|
| 3,197,814 | 8/1965 | Bond, Jr. et al. ............... 425/376 R |
| 3,300,810 | 1/1967 | Gregory et al. ..................... 366/82 |
| 3,375,549 | 2/1968 | Geyer .................................. 366/90 |
| 3,411,179 | 11/1968 | Gregory et al. ................... 425/209 |
| 3,486,192 | 12/1969 | LeRoy . |
| 3,577,494 | 5/1971 | Chisholm et al. ................. 264/349 |
| 3,756,574 | 9/1973 | Maddock . |
| 3,767,754 | 10/1973 | Manning et al. ................ 264/176 R |
| 3,998,318 | 12/1976 | McAlarney ........................ 425/208 |
| 4,036,540 | 7/1977 | Seufert ................................ 366/83 |
| 4,053,143 | 10/1977 | Hosokawa et al. . |
| 4,129,386 | 12/1978 | Rauwendaal ........................ 366/89 |
| 4,155,655 | 5/1979 | Chiselko . |
| 4,243,619 | 1/1981 | Fraser et al. ....................... 264/564 |

FOREIGN PATENT DOCUMENTS

| | | |
|---|---|---|
| 4645 | 10/1979 | European Pat. Off. . |
| 4646 | 10/1979 | European Pat. Off. . |
| 4647 | 10/1979 | European Pat. Off. . |
| 54-148093 | 11/1979 | Japan . |

Primary Examiner—Jeffery R. Thurlow
Attorney, Agent, or Firm—Gerald R. O'Brien, Jr.

[57] ABSTRACT

A method is disclosed for the extrusion of low-density linear polyolefin materials having high viscosities, wherein such materials are continuously fed to and through a rotary extruder having feeding, transition and metering sections which comprises employing, in the extruder screw forming such sections in cooperation with the cylindrical interior of the extruder housing, opened leading edges for the screw flights of said sections; and gall-resistant coated surfaces on the screw flights of said sections.

8 Claims, 4 Drawing Figures

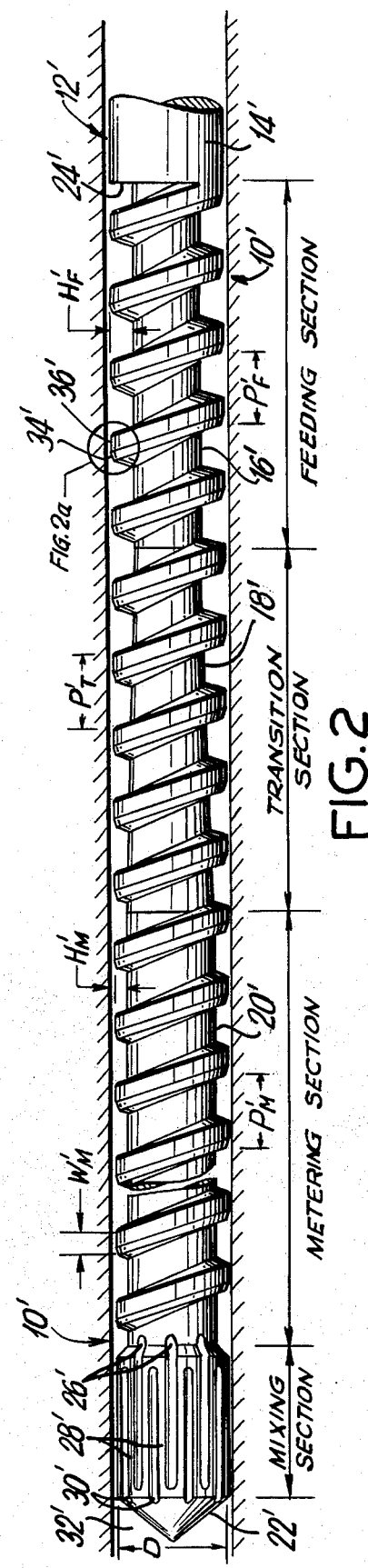
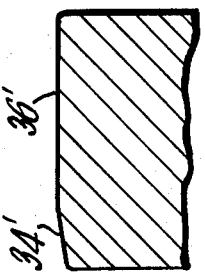
FIG.2
FIG.2a

METHOD FOR EXTRUDING LINEAR POLYOLEFIN MATERIALS HAVING HIGH VISCOSITIES

This invention relates to a method for extruding linear polyolefin materials having high viscosities, particularly such ethylene copolymers.

Conventional low density polyethylene has been historically polymerized in heavy walled autoclaves or tubular reactors at pressures as high as 50,000 psi and temperatures up to 300° C. The molecular structure of high pressure, low density polyethylene (HP-LDPE) is highly complex. The permutations in the arrangement of their simple building blocks are essentially infinite. HP-LDPE's are characterized by an intricate long chain branched molecular architecture. These long chain branches have a dramatic effect on the melt rheology of these resins. HP-LDPE's also possess a spectrum of short chain branches, generally 1 to 6 carbon atoms in length. These short chain branches disrupt crystal formation and depress resin density.

With recent developments in low pressure technology, low density narrow molecular weight distribution linear ethylene polymers can now be produced at low pressures and temperatures by copolymerizing ethylene with various alphaolefins. These low pressure LDPE (LP-LDPE) resins generally possess little, if any, long chain branching. They are short chain branched with branch length and frequency controlled by the type and amount of comonomer used during polymerization.

U.S. patent application Ser. No. 892,325 filed Mar. 31, 1978, abandoned and refiled as Ser. No. 014,414 on Feb. 27, 1979, in the names of F. J. Karol et al and entitled Preparation of Ethylene Copolymers In Fluid Bed Reactor, now issued as U.S. Pat. No. 4,195,121 and which corresponds to European patent application No. 79,100,953.3 which was published as Publication No. 004,645 on Oct. 17, 1979, discloses that ethylene copolymers, having a density of 0.91 to 0.96, a melt flow ratio of $\geq 22$ to $\leq 32$ and a relatively low residual catalyst content can be produced in granular form, at relatively high productivities if the monomer(s) are copolymerized in a gas phase process with a specific high activity Mg-Ti containing complex catalyst which is blended with an inert carrier material.

U.S. patent application Ser. No. 892,322 filed Mar. 31, 1978, abandoned and refiled as Ser. No. 012,720 on Feb. 16, 1979, and further refiled on May 15, 1981 as Ser. No. 264,091 in the names of G. L. Goeke et al and entitled Impregnated Polymerization Catalyst, Process For Preparing, and Use For Ethylene Copolymerization, and which corresponds to European patent application No. 79,100,958.2 which was published as Publication No. 004,647 on Oct. 17, 1979, discloses that ethylene copolymers, having a density of 0.91 to 0.96, a melt flow ratio of $\geq 22$ to $\leq 32$ and a relatively low residual catalyst content can be produced in granular form, at relatively high productivities, if the monomer(s) are copolymerized in a gas phase process with a specific high-activity Mg-Ti containing complex catalyst which is impregnated in a porous inert carrier material.

U.S. patent application Ser. No. 892,037 filed Mar. 31, 1978, abandoned and refiled as Ser. No. 014,412 on Feb. 27, 1979, and further refiled on Mar. 31, 1981 as Ser. No. 229,447 in the names of B. E. Wagner et al and entitled Polymerization Catalyst, Process For Preparing And Use For Ethylene Homopolymerization, and which corresponds to European patent application No. 79,100,957.4 which was published as Publication No. 004,646 on Oct. 17, 1979, discloses that ethylene homopolymers having a density of about $\geq 0.958$ to $\leq 0.972$ and a melt flow ratio of about $\geq 22$ to about $\leq 32$ which have a relatively low residual catalyst residue can be produced at relatively high productivities for commercial purposes by a low pressure gas phase process if the ethylene is homopolymerized in the presence of a high-activity Mg-Ti-containing complex catalyst which is blended with an inert carrier material. The granular polymers thus produced are useful for a variety of end-use applications.

The polymers as produced, for example, by the processes of said applications using the Mg-Ti containing complex catalyst possess a narrow molecular weight distribution, Mw/Mn, of about $\geq 2.7$ to $\leq 4.1$.

Over the years, film extrusion equipment has been optimized for the rheology of HP-LDPE. The different molecular architecture of low pressure-low density polyethylene (LP-LDPE) result in a film processing behvaior which requires different extrusion parameters. By way of background, conventional extruder screws commonly used for HP-LDPE include an elongated barrel which may be heated or cooled at various locations along its length and a screw which extends longitudinally through the barrel. The screw has a helical land on its surface which cooperates with the cylindrical internal surface of the barrel to define an elongated helical channel. Although the pitch of the screw may vary along the length thereof, it is common at the present time to utilize screws of constant pitch wherein the pitch is "square", that is, where the distance between equivalent locations on adjacent flights is equal to the diameter. The screw is rotated about its own axis to work the plastic material and feed it toward the outlet end of the barrel.

An extruder screw ordinarily has a plurality of sections which are of configuration specially suited to the attainment of particular functions. Examples are "feed" sections and "metering" sections, which are of basic importance and are present in nearly all extruders for handling thermoplastic polymers.

A typical extruder screw feed section extends beneath and forwardly from a feed opening where polymer in pellet or powder form is introduced into the extruder to be carried forward along the inside of the barrel by the feed section of the screw. In this section the channel depth of the screw is usually large enough to over-feed the solid polymer. This is a desirable effect because the over-feeding action serves to compact and pressurize the polymer particles and form a solid bed of advancing material.

The working of the material generates heat, and melting of the polymer proceeds as the material is moved along the feed section of the screw. Actually, most of the melting occurs near the barrel surface at the interface between a thin melt film and the solid bed of polymer. This general pattern persists until a substantial portion of the polymer reaches the melted state. After some 40 to 70 percent of the polymer has been melted, solid bed breakup usually occurs, and at this time particles of solid polymer become dispersed in the polymer melt. From this point on, it often is advantageous to intimately mix the polymer melt with the unmelted material to accelerate melting and minimize local non-uniformities.

An extruder screw "metering" section has as its special function the exertion of a pumping action on the molten polymer. Ordinarily the throughput achieved by a screw is thought of as being a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component but of course it may affect such factors as back pressure and material viscosity, which factors, in turn, affect significantly the pressure flow component. On the other hand pressure flow is directly affected by both the depth and length of the screw channel; an increase in channel depth has a tendency to increase greatly the pressure flow component and an increase in channel length has a tendency to reduce this back flow component.

In addition to the basic "feed" and "metering" sections an extruder screw also may include a number of other distinct sections. Nearly all screws include, for example, so called "transition" sections. Also a final downstream mixing section may preferably be employed.

Over the years there has been a trend toward the use of extruders capable of high outputs. In many applications, various economies in production are possible where high extruder outputs can be obtained on a reliable basis.

Although LP-LDPE resins can be extruded on equipment designed for HP-LDPE resins, such as described above, certain equipment modifications are often required in order to extrude the low pressure, high viscosity resins at optimum conditions and at rates comparable to the high pressure resins. This is particularly true during extrusion of LP LDPE which is subsequently processed into film by passage through the breaker plate of the extruder with conventional film forming dies as are well known to the art.

The rapid destruction of the wear surfaces of an extruder is not simply a wear problem but is a galling problem in which metal-to-metal contact occurs. Minute welds are formed between the screw material and barrel material. These welds are then torn apart by the rotation of the screw and particles are pulled out of the screw and barrel. These particles will show up on the screen pack and are early evidence of severe wear problems. A second piece of evidence which indicates rapid wear is a rapid decrease in output at one screw speed. This occurs because the large clearances between the screw and barrel generated by the wear phenomena will reduce the pumping capability and reduce the output/RPM.

The forces which generate the galling are believed to arise from differential pressures around the circumference of the screw and result in a lateral thrust on the screw. The lateral thrusts are most likely to occur in transition section of the screw as the pressure differences are larger. Normally a melt film exists between the screw tip and the barrel, but this lubrication can fail for a number of reasons:

1. Lateral force high enough to break through the film,
2. A melt fracture phenomenon which may destroy the continuity of the film;,
3. Polymer may be a poor lubricant.

If the film breaks, then the types of metal used on the flight tips and barrel become extremely important and must be chosen carefully to avoid galling. Experience has shown that if a serious galling problem is present in an extrusion system, it will occur very rapidly after the screw has started turning, and normally will have occurred sufficiently to be observed by the naked eye within the first 4–12 hours of operation.

Accordingly, the present methods for extruding LP-LDPE resins are not entirely satisfactorily from a practical commercial standpoint and there currently exists a need for providing an extrusion method which provides additional compression without the development of ensuing mechanical problems.

It is the general object of this invention to provide an improved method for dealing with problems of the types mentioned above.

The other objects of the invention will be apparent from the following description and appended claims.

In accordance with the present invention, a method is provided for the extrusion of low-density, linear polyolefin materials having high viscosities, wherein such materials are continuously fed to and through a rotary extruder, including an extruder housing defining a cylindrical interior and containing an extruder screw having a helical flight, having feeding, transition and metering sections, which comprises employing, in the extruder screw in cooperation with the cylindrical interior of the outer extruder housing, opened leading edges* for the screw flights of such sections; and gall-resistant coated surfaces on the screw flights of such sections.

* "opened leading edges" denotes a geometry wherein at least one portion of the flight has a narrower clearance (or gap) than at the leading edge.

Other improvement aspects in accordance with the method of the invention comprise employing: screw flights of feeding, transition and metering sections increased by at least 20% in width over conventional extruder screws to increase the bearing surface of the screw; reduced root depth of the screws of the feed section by at least 10% over conventional extruder screws in order to stiffen the screw; increased length of the transition section by at least 50% over those commonly present in such a section between a feeding and metering section in order to reduce the rate of pressure rise therein; and increased radial clearance between the extruder screw and the walls of the cylindrical interior of the extruder housing by about 100% over conventional radial clearances in order to reduce the pressure within the extruder; in order to provide an additional safety factor with regard to machinery and equipment alignment.

It has been found that much of the mechanical problems, such as extruder internal surface galling, are relieved by the improvement of extruder screws having opened leading edges for the screw flights and having additionally gall-resistant coated surfaces on the screw flights. As defined hereinabove, the term "opened"

refers to the reduced diameter leading edge taper of the screw flights, as is shown in the schematic view of FIG. 2a of the drawings. The "gall-resistant coated surface" on the screw flights referred to herein are understood to mean that the hard-surface alloy coatings which are known to those skilled in the art as improving gall-resistant properties. Examples of such alloys are the nickel-base chromium, silicon, iron, and boron-containing alloys produced by Wall Colmonoy Corporation of Detroit, Michigan, U.S.A. and sold for this purpose. Such alloys are normally applied as thin surface coatings from either bare or coated rod or crushed powder additions in a gas or electric weld-surfacing operation. One such alloy is Colmonoy No. 56 having a normal chemical analysis of: CR 12.5%; Fe 4.5%, Si 4.0%; B 2.75%; C 0.70%; and the balance Ni.

Other improvement aspects, in accordance with the method of the invention, which are also effective, but to a lesser degree in improving mechanical difficulties are as follows:

Increasing by at least 20% the width of the screw flights of the feeding, transition and metering sections of the screw, over those conventionally employed in order to increase the working surface of the screw with the internal surface of the extruder housing;

Reducing the depth of the screw in the feed section by at least 10% over conventional screws in order to stiffen the screw and minimize erratic flexing which would cause increased wear on the contact points between the surface of the screw and the internal surface of the extruder housing;

Increasing the length of the screw in the transition section by at least 50% over the length presently employed in such section in order to reduce the rate of pressure rise therein; and Increasing the radial clearance between the helical flights of the extruder screw and the internal walls of the extruder housing in order to provide a greater safety factor with regard to machinery and equipment alignment.

In the accompanying drawings:

FIG. 2 is a schematic view, similar to that of FIG. 1, showing multi-section apparatus capable of use with the method of the present invention;

FIG. 2a is a partial sectional schematic view of the circled portion of the extruder screw tip of FIG. 2;

Although the drawings primarily illustrate extruder screws suitable for practicing the methods of the prior art and present invention, respectively, it will be understood that the extruder screws are utilized in their normal environment, i.e., in cooperative association with conventional frame means, a horizontally-extending barrel, feed and hopper means and a drive means and breaker plate, all of which are not shown and constitute apparatus known to the art. Merely as illustrative, the extruder screws may be employed in conjunction with apparatus of the type disclosed in U.S. Pat. Nos. 4,155,655 and 4,053,143.

Figure 1:
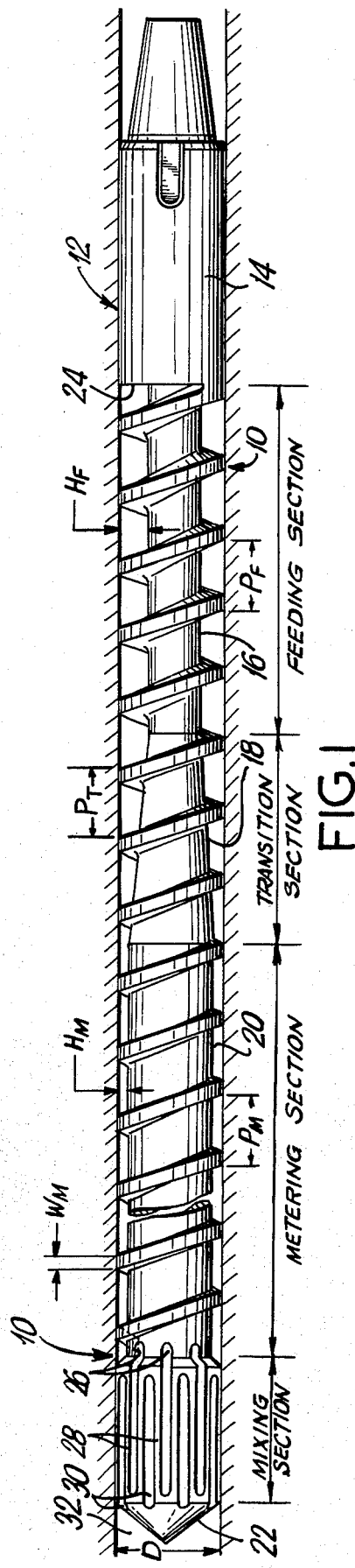
FIG. 1 is a vertical elevational schematic view, partially in section, of an extruder screw such as is capable of use in prior art multi-section (stage) extrusion methods.

As employed in present methods, extruders of the type disclosed in copending U.S. patent application Ser. No. 064,399 filed Aug. 8, 1979, now pending and entitled "A Process for Extruding Ethylene Polymers", (having an extrusion screw with a length-to-diameter ratio of between about 15:1 to 21:1) and shown schematically in FIG. 1 are provided having extruder housing 10 and a multi-section extruder screw 12 therein having a shank drive portion 14 at the rearward end thereof; a feeding section 16 immediately downstream thereof; a transition section 18 next downstream thereof; a metering section 20 next downstream thereof; and, optionally, a terminal mixing section 22 at the downstream end thereof.

The feeding, transition and metering sections of the screw all have threads of equal lead (lead=pitch/no. of flights) as indicated by $P_F$, $P_T$ and $P_M$ in the drawings.

The linear polyolefin material to be extruded is fed in granular form (not shown) through the extruder housing 10 near the upstream end 24 of the feeding section 16. The granular material is thus passed through the feeding section having a uniform root depth $H_F$ and is initially compacted and compressed in the feeding section which serves to develop heat within the material and effect the beginnings of melting of the solid material by the time it is passed into the transition section 18.

In the transition section, the screw root depth successively decreases from a value of $H_F$ to a value of $H_M$, the screw root depth of the metering section. The transition section has a length of approximately three times the normal screw diameter. Material passing through the section continues to melt, initially interfaces between already molten polymer and solid compacted granular material, to a point where solid particles break up and small particles of solid polymer become dispersed in the main body of primarily molten polymer material.

The final mechanical working and pumping of the molten polymer is achieved in metering section 20 of the screw (as shown in FIG. 1) from where the primarily polymer melt is passed to the optional final section, the mixing section 22. The mixing section may be of the type which is referred to as a "fluted mixing head" which is disclosed in U.S. Pat. No. 3,486,192 issued Dec. 30, 1969 to G. LeRoy and entitled "Apparatus for Extrusion of Thermoplastics".

Final mixing and homogenization of the polymer material is carried out in the fluted screw mixing section. As the material is broken into a number of streams, each entering a successive inlet fluted passage 26, it is forced from such passages over intervening lands 28 into outlet flutes 30 which discharge the highly mixed molten material from the fluted mixing section and into the discharge end 32 of the extruder housing 10.

As employed in the improved method of the present invention, an extruder of the type shown schematically in FIGS. 2 and 2a is provided having substantially the same apparatus elements described hereinabove with respect to FIG. 1 apparatus employed in conjunction with the practice of the current extruder methods. As identified in FIG. 2, common elements are assigned the same identifying numbers, primed to distinguish between the figures of the drawings.

As shown in FIG. 2 of the drawings, it can be seen that the screw root depth $H'_F$ has been decreased from the depth employed in the apparatus of FIG. 1. In addition, it can be seen that the number of turns of the screw of the transition section has been increased by about two-thirds over the number of turns of the transition section screw portion of FIG. 1. Further, it can be seen that the width of the screw threads of the feed, transition and metering sections have been increased by about 25% over the widths of the equivalent screw threads of FIG. 1.

The exploded section of FIG. 2a shows the "opened" edge 34' with leading edge of a screw thread tip 36' in the feeding section 16' of the screw of FIG. 2.

Figure 3:
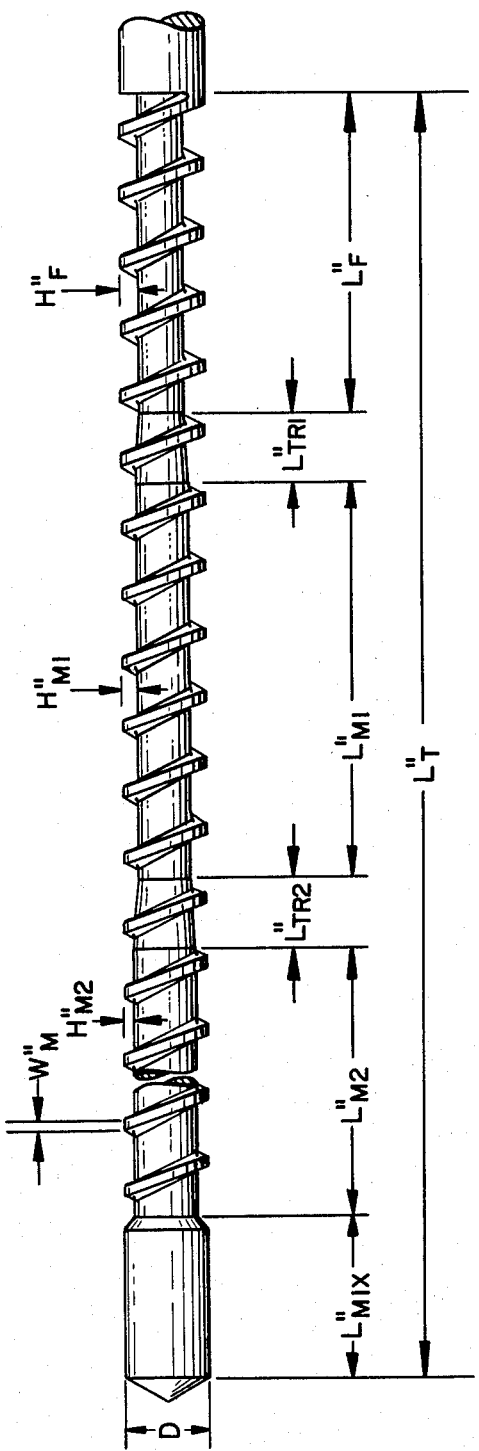
FIG. 3 is a schematic view of a screw similar to that of FIG. 2, but having a double metering section.

The extruder screw shown in FIG. 3 of the drawings has double metering screw sections (designated in length as $L''_{M1}$ and $L''_{M2}$) with double transition screw sections (designated in length as $L''_{TR1}$ and $L''_{TR2}$). In all other respects, the designated elements are double-primed elements corresponding to those of FIGS. 1 and 2 of the drawings. The actual dimensions of elements of the extruder screw of FIG. 3 employed in the following Examples 1 and 2 are as follows:

| Element | Inches or Ratio |
|---|---|
| D | 4.5 |
| $L_T''$ | 85.5 |
| L/D | 19/1 |
| $L_F''$ | 5 L/D |
| $L_{TR1}''$ | 1 L/D |
| $L_{TR2}''$ | 1 L/D |
| $L_{M1}''$ | 5 L/D |
| $L_{M2}''$ | 4 L/D |
| $L_{MIX}''$ | 3 L/D |
| $H_F''$ | 0.700 |
| $H_{M1}''$ | 0.385 |
| $H_{M2}''$ | 0.250 |
| $W_M''$ | 0.45 |

EXAMPLE 1

A screw such as shown in FIG. 3 and constructed according to practices commonly employed in the extrusion industry was installed in an extruder barrel also constructed according to standard industry practice (i.e., made with a barrel liner of Xaloy 101, sold by Xaloy Corp., New Brunswick, New Jersey, U.S.A.). Some of the common practices used in the construction of the screw are as follows: flight width equal to 0.1 times the nominal screw diameter, flight tips coated with a hard surfacing material available commercially from Stellite Division, Cabot Corp., Kokomo, Indiana, U.S.A. and known as Stellite 6, flat flight-tip surfaces, flight clearance (from the nominal diameter) equal to 0.001 times the nominal screw diameter.

The above screw-barrel combination was used in their normal environment, i.e., in cooperative association with a drive means, conventional frame means, and feed and hopper means. A variety of ethylene-butene copolymers which are available commercially from Union Carbide Corporation, New York, New York, U.S.A. were introduced into the screw through the hopper opening according to standard industry practice. The screw was allowed to run normally (i.e., nearly continually) for a period of about six weeks (with a total throughput of about 19 tons). At this point the screw was removed and examined. Substantial amounts of wear had occurred on the screw flights, as outlined in the following table:

| Axial Distance from Feed (In) | Radial Wear (In) |
|---|---|
| 4.5 | .000 |
| 9.0 | .001 |
| 13.5 | .003 |
| 18.0 | .009 |
| 22.5 | .010 |
| 27.0 | .013 |

-continued

| Axial Distance from Feed (In) | Radial Wear (In) |
|---|---|
| 31.5 | .014 |
| 36.0 | .016 |
| 40.5 | .017 |
| 45.0 | .018 |
| 49.5 | .016 |
| 54.0 | .016 |
| 58.5 | .013 |
| 63.0 | .012 |
| 72.0 | .012 |

This rate of wear greatly exceeds what is normally encountered in the industry. In addition, it was apparent from inspection of the screw that the wear was of a type known as galling (i.e., small sections of metal-to-metal welding together and tearing apart of the surfaces).

EXAMPLE 2

A screw such as shown in FIG. 3 and constructed according to practices commonly employed in the extrusion industry except for applying a layer of a commercially-available material known as Colmonoy 56 (gall-resistance surface coating material) on the surface of the flights having a flight clearance equal to 0.002 times the nominal screw diameter and having a bevel of about 1 degree to the leading edge of the flight was installed in an extruder barrel also constructed according to standard industry practice (i.e., made with a liner of Xaloy 101). One of the common practices used in the construction of the screw are as follows: flight width equal to 0.1 times the nominal screw diameter.

The above screw-barrel combination was used in their normal environment, i.e., in cooperative association with a drive means, conventional frame means, and feed and hopper means. A variety of ethylene-butene copolymers which are available commercially from Union Carbide Corporation, New York, N.Y., U.S.A., were introduced into the screw through the hopper opening according to standard industry practice. The screw was allowed to run normally (i.e., nearly continually) for a period of about 30 hours, at which time it was removed and inspected for any signs of wear (e.g., scoring, "mushrooming" of the flights, or increase in flight clearance). No evidence of any wear was found at any location along the flights of the screw.

EXAMPLE 3

A screw such as shown in FIG. 1 and constructed according to practices commonly employed in the extrusion industry was installed in an extruder barrel also constructed according to standard industry practice. Some of the common practices used in the construction of the screw are as follows: flight width equal to 0.1 times the nominal screw diameter, flight tips hardened by a process known as flame-hardening, flat flight-tip surfaces, flight clearance (from the nominal diameter) equal to 0.001 times the nominal screw diameter.

The above screw-barrel combination was used in their normal environment, i.e., in cooperative association with a drive means, conventional frame means, and feed and hopper means. A variety of ethylene-butene copolymers which are available commercially from Union Carbide Corporation, New York, N.Y., U.S.A., were introduced into the screw through the hopper opening according to standard industry practice. The screw was allowed to run normally (i.e., nearly continually) for a period of about ten weeks (with a total throughput of about 80 tons). At this point the screw was removed and examined. Substantial amounts of wear had occurred on the screw flights, as outlined in the following table:

| Axial Distance from Feed (MM) | Radial Wear (MM) | (IN) |
|---|---|---|
| 125 | .788 | .031 |
| 250 | .610 | .024 |
| 375 | .000 | .000 |
| 500 | .228 | .009 |
| 625 | .330 | .013 |
| 750 | .330 | .013 |
| 875 | .432 | .017 |
| 1000 | .559 | .022 |
| 1125 | .863 | .034 |

This rate of wear greatly exceeds what is normally encountered in the industry. In addition, it was apparent from inspection of the screw that the wear was of a type known as galling (i.e., small sections of metal-to-metal welding together and tearing apart of the surfaces).

EXAMPLE 4

A screw such as shown in FIG. 2 and constructed according to practices commonly employed in the extrusion industry except for the following: applying a layer of a commercially-available material known as colmonoy 56 on the surface of the flights, applying a bevel of about 1 degree to the leading edge of the flight, flight width equal to 0.12 times the nominal diameter (20% above the industry norm), flight clearance equal to 0.002 times the nominal diameter (twice the industry norm), feed section shallower than the industry norm for a high-output screw, a transition section equal to 5 times the nominal screw diameter (versus a typical value of 3 times the nominal screw diameter for LDPE). This screw was installed in an extruder barrel also constructed according to standard industry practice (i.e., made with a liner of Xaloy 101).

The above screw-barrel combination was used in their normal environment, i.e., in cooperative association with a drive means, conventional frame means, and feed and hopper means. A variety of ethylene-butene copolymers, which are available commercially from Union Carbide Corporation, New York, N.Y., U.S.A., were introduced into the screw through the hopper opening according to standard industry practice. The screw was allowed to run normally (i.e., nearly continually) for a period of about 8 weeks (with a total throughput of about 240 tons), at which time it was removed and inspected for any signs of wear (e.g., scoring, "mushrooming" of the flights, or increase in flight clearance). No evidence of any wear was found at any location along the flights of the screw.

The various copolymers employed in the examples reported hereinabove were prepared in accordance with the procedure disclosed in U.S. patent application Ser. No. 892,322 filed Mar. 31, 1978 in the names of F. J. Karol, et al. abandoned and refiled on Feb. 16, 1979 as Ser. No. 012,720 (corresponding Japanese application Ser. No. 79-037157 now published as No. 79-148039), now issued as U.S. Pat. No. 4,195,121. Such copolymers contained at least 90% ethylene and up to 10% butene-1; had a density between 9.17–9.20; a melt index between 0.9–1.0; and a melt flow ratio between 25–30.

What is claimed is:

1. In the extrusion of low-density, linear polyolefin materials having high viscosities, wherein such materials are continuously fed to and through a rotary extruder including an extruder housing defining a cylindrical interior and containing an extruder screw having helical screw flights having feeding, transition and metering sections, the improvement which comprises employing, in said extruder screw in cooperation with the cylindrical interior of said extruder housing, opened leading edges for said screw flights of said sections; and surfaces of the screw flights of said sections coated with gall-resistant material.

2. The method for the extrusion of low-density linear polyolefin materials having high viscosities in accordance with claim 1, wherein the screw flights of said feeding, transition, and metering sections are increased at least 20% in width over conventional widths to increase the bearing surface of said screw.

3. The method in accordance with claim 1, wherein the depth of the screws of the feed section is reduced at least 10% from conventional depths in order to stiffen said screw.

4. The method in accordance with claim 1, wherein the length of the transition section is increased by at least 50% over conventional lengths employed in such a section between a feeding and metering section in order to reduce the rate of pressure rise therein.

5. The method in accordance with claim 1, wherein the radial clearance between said extruder screw and the walls of said cylindrical interior of the extruder housing is increased of the order of 100% over conventional clearances employed.

6. The method in accordance with claim 1, wherein a mixing section is additionally employed downstream of said extruder screw sections.

7. In the extrusion of linear polyolefin materials having high viscosities, wherein such materials are continuously fed to and through a rotary extruder having feeding, transition and metering sections, the improvement which comprises employing, in the extruder screw forming such sections in cooperation with the cylindrical interior of the outer extruder housing, opened leading edges for the screw flights of said sections; surfaces of the screw flights of said sections coated with gall-resistant material; screw flights of said feeding, transition and metering sections are increased at least 20% in width to increase the bearing surface of said screw; the depth of the screws of the feed section is reduced at least 10% in order to stiffen said screw; the length of the transition section is increased by at least 50% over those normally employed in such a section between a feeding and metering section in order to reduce the rate of pressure rise therein; and the radial clearance between said extruder screw and the walls of said cylindrical interior of the extruder housing is increased of the order of 100%.

8. The method in accordance with claim 7, wherein a mixing section is additionally employed downstream of said extruder screw sections.

* * * * *